United States Patent [19]

Shimotono

[11] Patent Number: 4,964,154
[45] Date of Patent: Oct. 16, 1990

[54] COMMUNICATION ADAPTER DEVICE FOR USE WITH A FACSIMILE DEVICE COMBINED WITH A COMPUTER

[75] Inventor: Susumu Shimotono, Hatano, Japan

[73] Assignee: Ricoh Company, Ltd., Tokyo, Japan

[21] Appl. No.: 296,700

[22] Filed: Jan. 13, 1989

[30] Foreign Application Priority Data

Jan. 14, 1988 [JP] Japan .................. 63-004831

[51] Int. Cl.⁵ ........................... H04M 11/00
[52] U.S. Cl. ..................... 379/100; 379/93; 379/211; 358/442
[58] Field of Search ........... 379/100, 93, 211; 358/257, 400, 442

[56] References Cited

U.S. PATENT DOCUMENTS

| | | | |
|---|---|---|---|
| 4,564,724 | 1/1986 | Nakayama | 379/100 |
| 4,652,933 | 3/1987 | Koshiishi | 358/257 |
| 4,802,204 | 1/1989 | Chang | 379/100 |
| 4,815,121 | 3/1989 | Yoshida | 379/100 |

FOREIGN PATENT DOCUMENTS

| | | | |
|---|---|---|---|
| 0044847 | 3/1983 | Japan | 379/211 |
| 2189115 | 10/1987 | United Kingdom . | |

Primary Examiner—Jin F. Ng
Assistant Examiner—Wing F. Chan
Attorney, Agent, or Firm—Oblon, Spivak, McClelland, Maier & Neustadt

[57] ABSTRACT

A communication adapter device for use in facsimile device combined with computer, which connects a facsimile device with a computer or connecting facsimile devices with each other comprising a telephone circuit interface portion, a facsimile device interface portion, electricity supplying means, a digital interface portion, first image information transmitting means, second image information transmitting means, third image information transmitting means, control means, communication state monitoring means, and change-over means for changing over the execution state of facsimile communication. The transmission of the image information can be done freely and the adminisitration of the correspondence state executed by the computer can be facilitated by use of the above-mentioned communication adapter device. As a result of utilizing such communication adapter device, the treatment of signla processing can be performed with a high degree of certainty.

19 Claims, 8 Drawing Sheets

COMMUNICATION ADAPTER DEVICE FOR USE WITH A FACSIMILE DEVICE COMBINED WITH A COMPUTER

BACKGROUND OF THE INVENTION

1. Field of the Invention

The present invention relates to a communication adapter device for connecting a facsimile device with a computer or connecting facsimile devices with each other.

2. Description of the Prior Art

In the recent years, a facsimile device provided with a digital interface portion conforming to the normal standard such as RS-232C, GP-1B, etc. has been already used practically. Such facsimile device can be connected with various sorts of computers such as personal computer through the interface portion as mentioned above.

In such a way, by connecting the facsimile device and the computer with each other, it may turn out to be possible to perform various processings, such as control of the facsimile device by the computer at the time of transmitting and receiving of messages, management of the facsimile communication state including such items as the past records of correspondence, correspondence fees, etc. The device also allows the taking-in of the image information receieved by the facsimile device into the computer, or transferring of the image information made by the computer by use of the facsimile device to the other facsimile device.

With this in resent years, the ordinary facsimile device has been already widely popularized together with the personal computer. Hereupon, since the ordinary facsimile device is not provided with the digital interface portion as mentioned above, even though both of the personal computer and the ordinary facsimile device are installed on the same place it was impossible to perform a communication between the computer and the facsimile device.

On the other hand, in the recent years, an additionally provided board and its software specially used for performing facsimile communication by use of the personal computer have been already put on the market. When the additionally provided board and the software are set to the personal computer and the operation of the personal computer is started, the personal computer can transmit the image information to the opponent party and receive the image information therefrom.

On this occasion, since the personal computer functions on the condition equal to that of a stand-alone facsimile device, exchanging of the image information or the like between the personal computer and the ordinary facsimile device, both of which have already been installed on the same place.

And further, in general, the personal computer is often used for various purposes at the same time. When the personal computer receives the image information from the other facsimile device, the personal computer is practicing other processing in many cases. Usually, the personal computer does not have a processing ability for performing the facsimile communication and the other processing at the same time as a multiple job. Therefore, in the case of receiving the signal (image information) as mentioned above, the image information cannot be received, if the processing under execution is not interrupted for a while. This is an inconvenience of the prior art device.

As mentioned heretofore, conventionally, the computer could not freely make a mutual correspondence of the image information between the computer and the ordinary facsimile device installed at the same place as that of the computer or between the computer and the other facsimile device connected with the public telephone circuit network, and the same could not administrate the correspondence state of the ordinary facsimile device. The above-mentioned matters were remaining as the problems to be solved.

SUMMARY OF THE INVENTION

It is an object of the present invention to solve the afore-mentioned problems.

It is another object of the present invention to enable the computer to freely make a mutual correspondence of the image information between an computer and the ordinary facsimile device.

It is still another object of the present invention to provide a communication adapter device capable of performing an administration of the correspondence state or situation between the facsimile devices.

DESCRIPTION OF THE PREFERRED EMBODIMENT

In order to attain the afore-mentioned objects, the present invention provides a communication adapter device installed at the facsimile station. The communication adapter device comprises:

(a) a public telephone circuit, (b) first transmission means for connecting the circuit terminal of the local-side facsimile device, that is, local-side device and the digital signal interface terminal with each other, supplying electricity to the above-mentioned circuit terminal of the local-side facsimile device in order to create an electrical condition equal to that of the aforementioned public telephone circuit, and, on the other hand, transmitting the image information between the remote-side facsimile device employed at the correspondence opponent and the computer, (c) second transmission means for mutually transmitting the image information between the local-side facsimile device and the computer, (d) third transmission means for mutually transmitting the image information between the remote-side facsimile device and the local-side facsimile device.

In such communication device, one of the above-mentioned three sorts of transmission means is selected and the selected means performs transmission of the image information, respectively. On the other hand, the information based on the communication between the remote-side and local-side facsimile devices is transferred to the afore-mentioned computer. And further, when the message is received from the remote-side facsimile device, the computer or the local-side facsimile device executes facsimile correspondence on the basis of the state of the computrer or the local-side facsimile device. The present invention is characterized in that the execution of facsimile correspondence is changed over to the computer or to the local-side facsimile device.

An embodiment of the present invention will be described in detail in accordance with the accompanying drawings.

Figure 1:
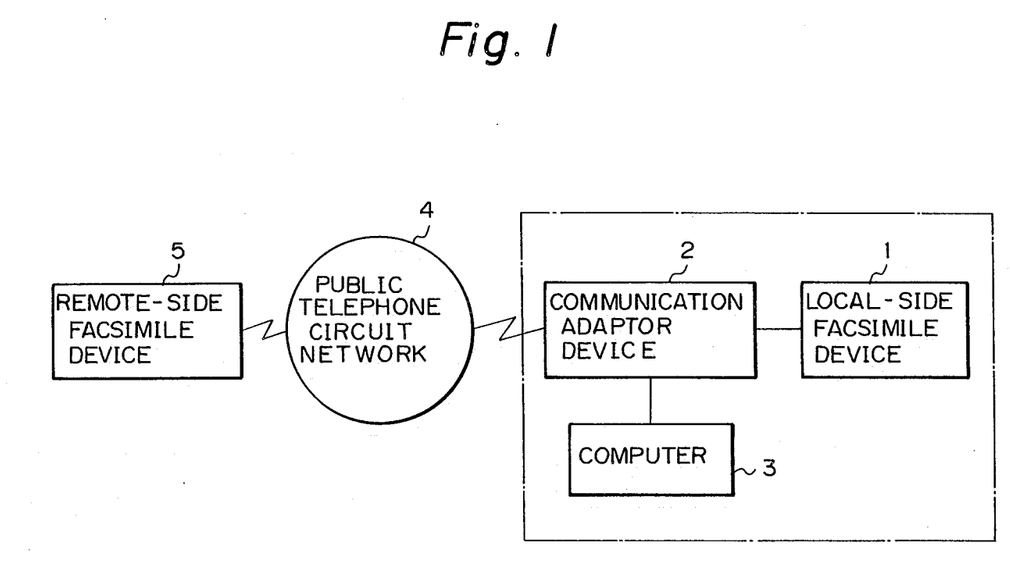
FIG. 1 is a block diagram of a facsimile communication system relating to an embodiment of the present invention.

FIG. 1 is an outlined system consstruction block diagram showing a facsimile communication system in relation to an embodiment according to the present invention. In FIG. 1, a local-side facsimile device 1 is a facsimile device made on the basis of the ordinary G3 specification employed conventionally. Its circuit terminals are connected with a communication adapter 2. A computer 3 and telephone circuits guided from the public telephone circuit network 4 are connected with the communication adapter device 2.

And further, a remote-side facsimile device 5 which is an unspecified correspondence opponent is connected with the public telephone circuit network 4. The remote-side facsimile device 5 is also a facsimile device made on the basis of the ordinary G3 specification exployed conventionally.

Figures 2, 2A:
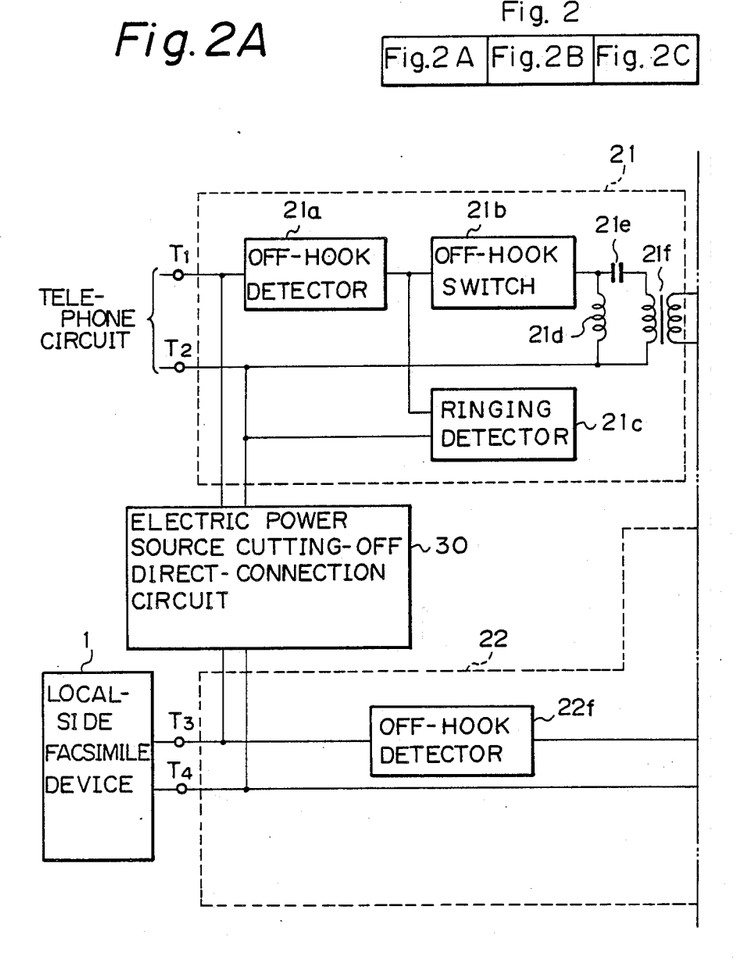
FIG. 2 is a detailed circuit diagram showing a circuit construction of the communication adapter.
Figure 2B:
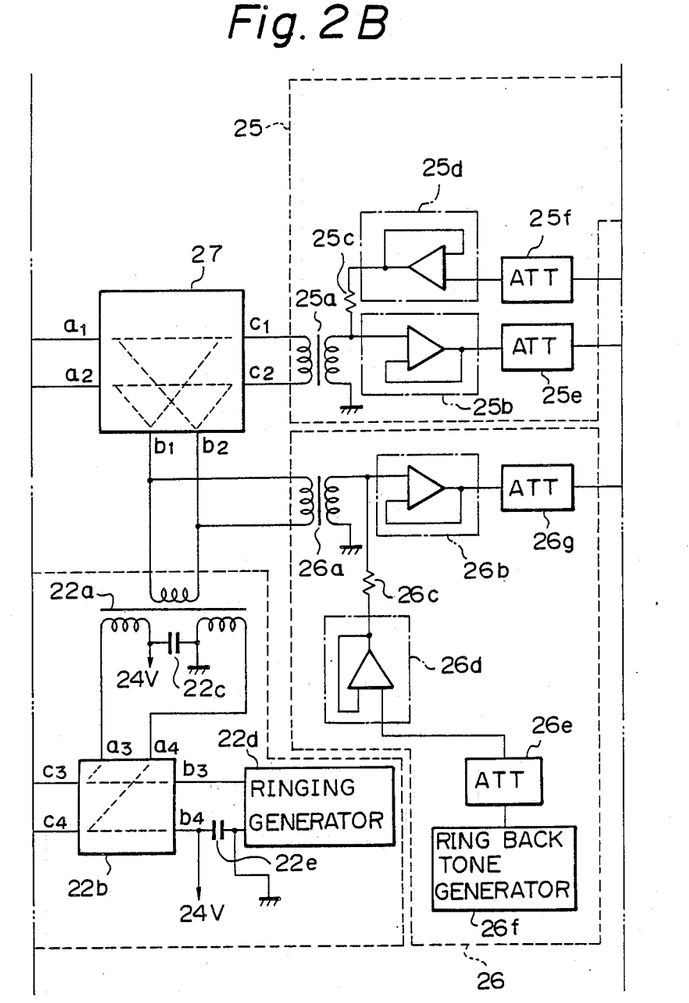
Figure 2C:
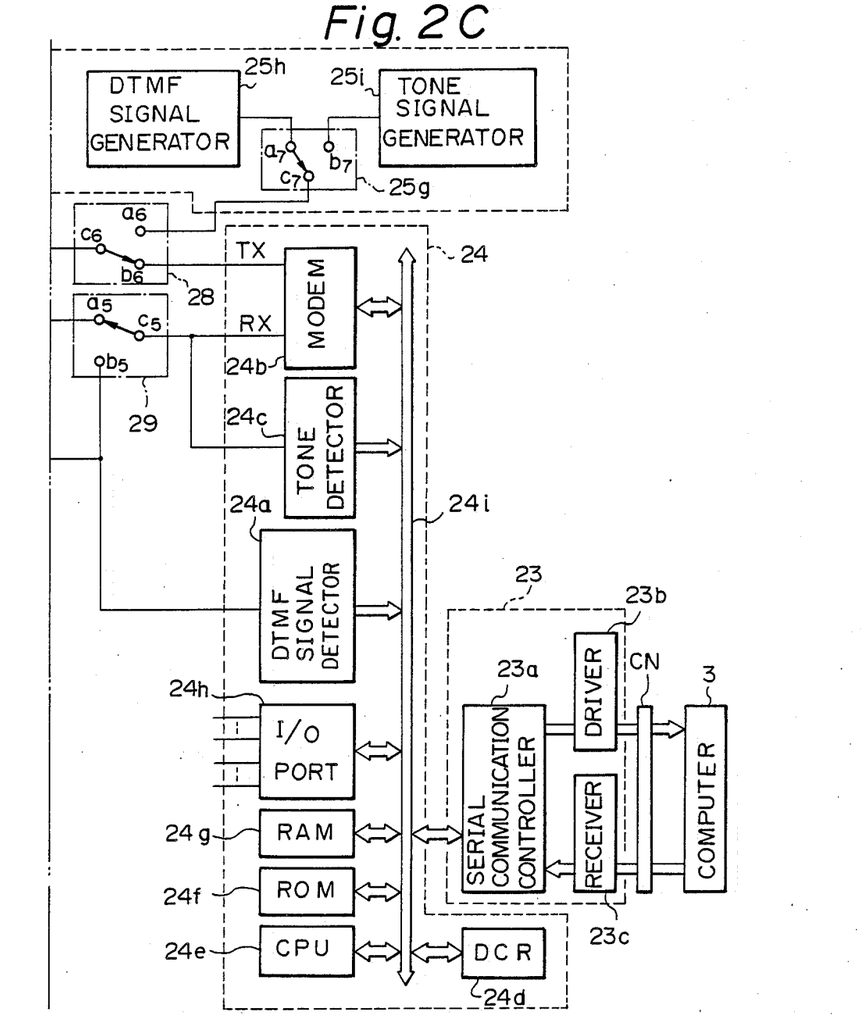

FIG. 2 is a detailed circuit diagram showing a circuit construction of the communication adaptor 2. In FIG. 2, an interface portion 21 of the telephone circuit is employed for connecting the circuit with each other and transmitting/receiving signals from a device to the other. The telephone circuits are connected with its terminals T1 and T2.

An interface portion 22 of the facsimile device is employed for transmitting the signals to the local side facsimile device 1 and receiving the signal therefrom. The circuit connecting terminals of the local-side facsimile device 1 are connected with its terminals T3 and T4. A digital interface portion 23 is employed for transmitting the signals to the computer 3 and receiving the signals therefrom. The interface 23 is a standard RS-232C type digital interface and the same is connected with the computer 3 through a connector CN.

The transmission control portion 24 is constructed with a microcomputer system. When a correspondence by facsimile is performed between the respective devices, the transmission control portion 24 practices, as occasion demands, control of transmission with the opponent facsimile device, transportation of the image information to be transmitted to and received from a predetermined device, observation of the correspondence state between the facsimile devices, and control of various portions in the facsimile device.

The correspondence portion 25 of the computer 3 is employed for use in transmitting various facsimile signals to the remote-side facsimile device and receiving the same therefrom. A local facsimile monitoring portion 26 is employed for monitoring the operational condition of the local-side facsimile device 1.

A change-over circuit 27 is employed for changing over the transmission path of the signal in accordance with the operational condition of the communication adapter device 2. An analog switch 28 is employed for changing over the transmission signal to be transmitted to one of the opponent facsimile devices. An analog switch 29 is employed for changing over the transmission signal to be transmitted to either one of a correspondence portion 25 of the facsimile device and a monitoring portion 26 of the local (local-side) facsimile device.

A electric power source cutting-off direct connection circuit 30 is a relay circuit for directly connecting the telephone circuit with the local-side facsimile device 1 when supplying of electric power is stopped, for instance, at the time of power stoppage, etc.

In the interface portion 21 of the telephone circuit, both of terminals T1 and T2 are connected with an input-output line of the direct-connection circuit 30. Furthermore, the terminal T1 is connected with one end of an off-hook detector 21a and another end thereof is connected with an off-hook switch 21b and a ringing detector 21c. The off-hook switch 21a is employed for judging whether the (telephone) circuit is physically connected with the opponent device by use of electric current flowing through the line of network at the time of connecting the circuit with the opponent device.

The other end of the off-hook switch 21b is connected with a direct current passing coil 21d and a direct current cutting-off capacitor 21e, and the other end of the capacitor 21e is connected with one end of the primary winding 21f-l transformer 21f. The respective other ends of those windings 21f-l, 21d and 21f are connected with the terminal T2.

The other (secondary) winding of the transformer 21f is connected with the terminals a1 and a2 of a change-over circuit 27. The terminals b1 and b2 of the change-over circuit 27 are respectively connected both with one of windings of a transformer 22a in an interface portion 22 of the facsimile device and with one of windings (primary winding) of a transformer 26a in a local facsimile monitoring portion 26.

The transformer 22a further has other two windings, and each one end of the respective windings is directly and respectively connected with the terminals a3 and a4 of a change-over circuit 22b, and the other end of one of two windings is earthed, while the other end of one of the other winding is earthed via a by-pass capacitor 22c and DC voltage of 24 V is applied thereto.

The terminal b3 of the change-over circuit 2ib is connected witrh the terminal b4 thereof through a ringing generator 22d and a by-pass capacitor 22e. A junction point of the ringing generator 22d and the by-pass capacitor 22e is also earthed, and DC voltage of 24 V is applied to the line of the terminal b4.

The terminal c3 of the change-over circuit 22b is connected with the terminal T3 and the terminal c4 thereof is connected with the terminal T4. And further, the terminals T3 and T4 are connected with the other input/output lines of the electric power source cutting-off direct connection circuit 30. An off-hook detector 22f detects the state of circuit connection of the local-side facsimile device 1 by detecting DC current of the lines.

The terminals c1 and c2 of the change-over circuit 27 are respectively connected with one of the windings of a transformer 25a in a correspondence portion 25. One end of the other winding of the transformer 25a is directly earthed, while other end thereof is directly connected with one input terminal of a voltage follower amplifier 25b and the same is connected via a resistor 25c with electric power source cutting-off direct another voltage follower 25d.

The output terminal of the voltage follower amplifier 25b is connected through an attenuator 25e with the contact point a5 of an analog switch 29, and the other input terminal of the voltage follower amplifier 25d is connected through another attenuator 25f with the common terminal c6 of an analog switch 28.

The contact point ab of the analog switch 28 is connected with the common terminal c7 of an analog switch 25g, and further the contact point a7 of the analog switch 25g is connected with a DTMF (Dual Tone Multiple Frequency) signal generator 25h and the contact point b7 thereof is connected with a facsimile tone signal generator 25i.

In the local facsimile monitoring portion 26, one end of the other winding of the transformer 26a is earthed, and further the other end thereof is directly connected with the input terminal of a voltage follower amplifier 26b and same is connected with the output terminal of another voltage follower amplifier 26d through a resistor 26c. A ring back tone generator 26f is connected with the input terminal of the voltage follower amplifier 26d through an attenuator 26e. The output terminal of the voltage follower amplified 26b is connected with the contact point b5 of the analog switch 29 and a DTMF signal detecting circuit 24a of a transmission control portion 24 both through another attenuator 26g. The common terminal c5 of the analog switch 29 is connected with the signal receiving terminal RX of a MODEM 24b in the transmission control portion 24 and a facsimile tone detecting circuit 24c, and the signal transmitting terminal TX is connected with the contact point b6 of an analog switch 28.

In the transmission control portion 24, a DCR (Data Compression And Reconstruction) 24d is employed for converting the data-compressed image information received from the facsimile device back to the image information constructed with the original pixel (picture element) unit. A central processing unit (CPU) 24e is employed for performing such various control actions in accordance with the control program stored in a read only memory (ROM) 24f, and a random access memory (RAM) 24g is employed for temporarily storing the image information to be transmitted and various sorts of data. And further, an Input/Output port 24h in FIG. 2 is connected with various detection circuits, various signal generating circuits and various change-over circuits arranged in the circuits described heretofore, and the same is employed for inputting and controlling the detection signals. The respective portions in the transmission control portion 24 is mutually connected with by means of a signal bus 24i.

The signal bus 24i is connected with a serial communication controller 23a in a digital interface portion 23.

The serial communication controller 23a is exployed for performing a serial communication with the computer 3 in conformity to RS-232C, both of a driver 23b (RS-232C type) and a receiver 23c (RS-232C TYPE) are connected with the computer 3 by a connector CN.

In the circuits described heretofore, the change-over circuit 27 performs change-over connection in three states, those are, a connection state a-c of connecting terminals a1 and a2 respectively with terminals c1 and c2, another connection state a-b of connecting terminals a1 and a2 with terminals b1 and b2, and still another state b-c of connecting terminals b1 and b2 with terminals c1 and c2.

The change-over circuit 22b performs change-over connection in two states, those are, a connection state a-c of connecting terminals a3 and a4 with terminals c3 and c4 and another state c-b of connecting terminals c3 and c4 with terminals b3 and b4.

The transformer 22a-side (primary) winding of the transformer 26a is set at a very high impedance. The transformer 21f is made in consideration of the state so as not to disturb its impedance matching. For instance, the transformers 21f, and 22a respectively have input-output impedance ration of 600$\Omega$: 600$\Omega$ in general. However, the suitable impedance value of the above-mentioned, (primary) winding is 10 k$\Omega$ or more.

The attenuators 25e and 26g respectively have an AGC (Automatic Gain Control) function for the received signal and a filtering function of removing unnecessary frequency band width. The attenuators 25f and 26e are respectively set at each proper transmission signal level.

A ring back tone generator 26f outputs a calling-out sound of the telephone network produced by AM-modulating with 16 Hz the tone signal of 400 Hz.

In the construction as mentioned heretofore, the facsimile communication system performs correspondence and administration as follows:

(1) Facsimile correspondence between the remote-side facsimile device 5 and the computer 3, (2) Facsimile correspondence between the remote-side facsimile device 5 and the local-side facsimile device 1, (3) Facsimile correspondence between the local-side facsimile device 1 and the computer 3, and (4) Monitoring of facsimile device correspondence executed between the remote-side facsimile device 5 and the local-side facsimile device 1, by use of the computer 3.

A predetermined software is set in the computer 3 for performing the correspondence and administration as mentioned above.

Now, in the case of making use of the facsimile communication system, first of all, when a telephone call from the facsimile device 5 arrives at the local station, whether the local-side facsimile device 1 responds thereto or the computer 3 responds thereto is previously set at the computer 3.

Assuming that the computer 3 is set such that the same responds thereto now, the operation of the signal arrival in the case of transmitting telephone call from the remote-side facsimile device 5 is described hereinafter.

Figure 3:
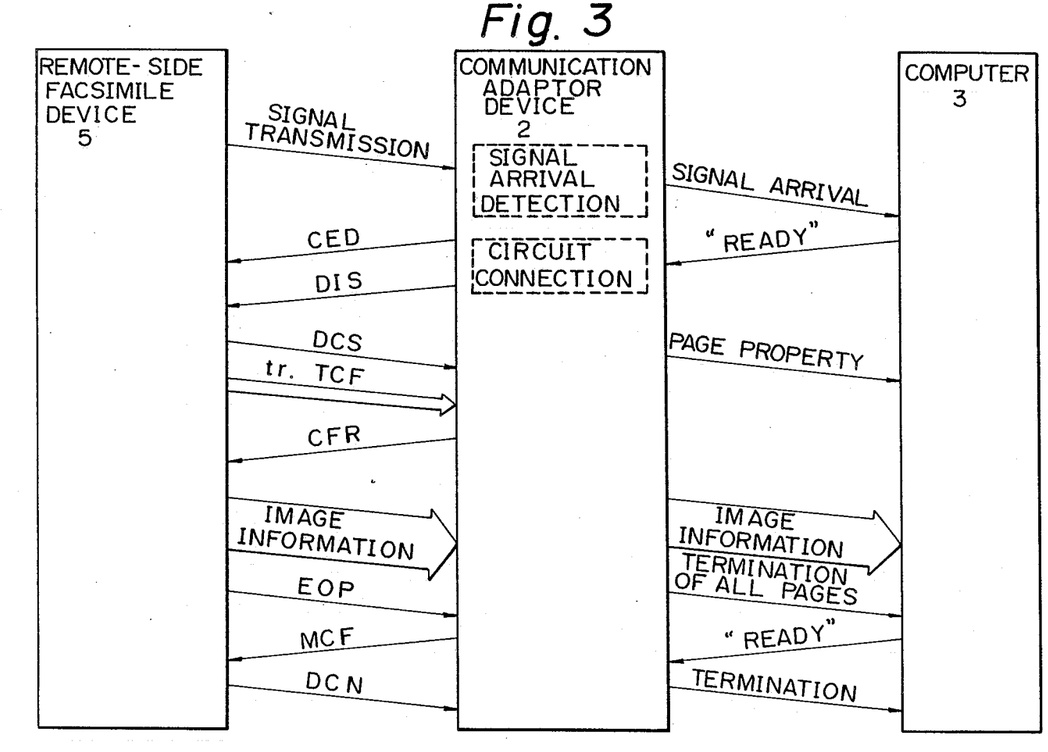
FIG. 3 is an explanatory view showing a procedure of transmitting/receiving signal between respective devices at the time of transmitting image information to the computer from the remote-side facsimile device.

FIG. 3. is an explanatory view showing a procedure of transmitting and receiving the respective signals between the respective devices on that occasion. Namely, the direct-connection circuit 30 is opened usually. When the remote-side facsimile device 5 transmits a telephone call to the local station, the telephone call arrival is detected by a ringing detector 21c of the communication adaptor 2. The transmission control portion 24 detects the telephone call arrival to the computer 3 through the serial communication controller 23a and the driver 23b of the digital interface portion 23.

The afore-mention telephone call arrival is noticed to the computer 3 in a state of being idle. In case that facsimile communication is enabled, the computer 3 returns back a response showing "READY" to the transmission control portion 24 through the receiver 23c and the serial communication controller 23a.

When the transmission control portion 24 confirms the afore-mentioned state of "READY", the same closes the off-hook switch 21b in order to connect the circuit with each other and starts the predetermined transmission control procedure in conformity to the article T.30 of the standard rule established by CCITT ("Comité Consultatif International Télégraphique et Téléphonique" meaning "International Telegraph And Telephone Consultative Committee"). Namely, the change-over circuit 27 is turned to the connection state a-c, the analog switch 28 to a6 side, and the analog switch 25g to the contact point b7 side, respectively. The facsimile tone signal generator 25i outputs CED (Called Station Identification) signal.

The CED signal that is output therefrom is transmitted to the remote-side facsimile device 5 via the telephone circuit, through the attenuator 25f, the voltage follower amplifier 25d, the resistor 25c, the transformer 25a, the change-over circuit 27, and the telephone circuit interface portion 21, in order.

Next, the transmission control portion 24 changes over the analog switch 28 to the contact point b6 side and the analog switch 29 to the a5 side. And thereby, the MODEM 24b outputs the DIS (Digital Identification Signal) signal and transmits it to the remote-side facsimile device 5 in a similar way.

On the other hand, the DCS (Digital Command Signal) signal, the phase-adjusting/training signal tr, and the TCF (Training Check) signal are returned back to the transmission control portion 24 from the remote-side facsimile device 5. Those signals are received by a MODEM (Modulator/Demodulator) 24b through a telephone circuit interface portion 21, a change-over circuit 27, a transformer 25a, a voltage follower amplifer 25b, an attenuator 25e, and an analog switch 29. The transmission control portion 24 executes the MODEM training in accordance with the above. When the portion 24 succeeds in executing the MODEM training, the transmission control portion 24 sends out the CFR (Confirmation TO Receive) signal. During the time period of executing the above-mentioned transmission control procedure, the above-mentioned DCS signal causes the remote-side facsimile device 5 to receive various page property information to be received thereafter, such as page size of image information, line density, coding mode, etc. Such page property information is transmitted to the computer 3.

Next, the remote-side facsimile device 5 transmits data-compressed image information. Such image information is received by the MODEM 24b and directly transmitted to the computer 3 through the digital interface portion 23. And, at the same time, the DCR 24d converts again the image information back to the original image information constructed with the former picture element unit. And further, existence or nonexistence of data error is checked on a line per line basis in the received data.

When the remote-side facsimile device 5 finishes transmission of the image information, it sends out the EOP (End Of Procedure) signal. The transmission control portion 24 receives the EOP signal and provides notification to the computer 3 that the portion 24 receives all pages of the image information. Furthermore, when the portion 24 receives the information normally, it sends out the MCF (Message Confirmation) signal to the remote-side facsimile device 5. On the other hand, the remote-side facsimile device 5 sends out the DCN (Disconnect) signal and cuts off the circuit. The off-hook switch 21b is thereby opened and cuts off the circuit.

The computer 3 stores the transmitted image information into the memory device or the like. When it is noticed to receive all pages, the computer 3 returns back the response showing "READY" to the transmission control portion 24 at the time of receiving the information normally. When the portion 24 receives the response thereof from the computer 3, the portion 24 notices the termination of signal receiving process to the computer 3 and finishes signal arrival process.

On the other hand, when the transmission control portion 24 receives the image information and detects a data error in the information, it notices the page(s) of the received image information which contained data error to the computer 3. And further, after finishing to receive all of the image information, the portion 24 notice data error of signal receiving to the remote-side facsimile device 5 with a predetermined procedure.

In such a way, a telephone call is emitted from the remote-side facsimile device 5 and the device 5 executes transmission of the image information to the computer 3.

Figure 4:
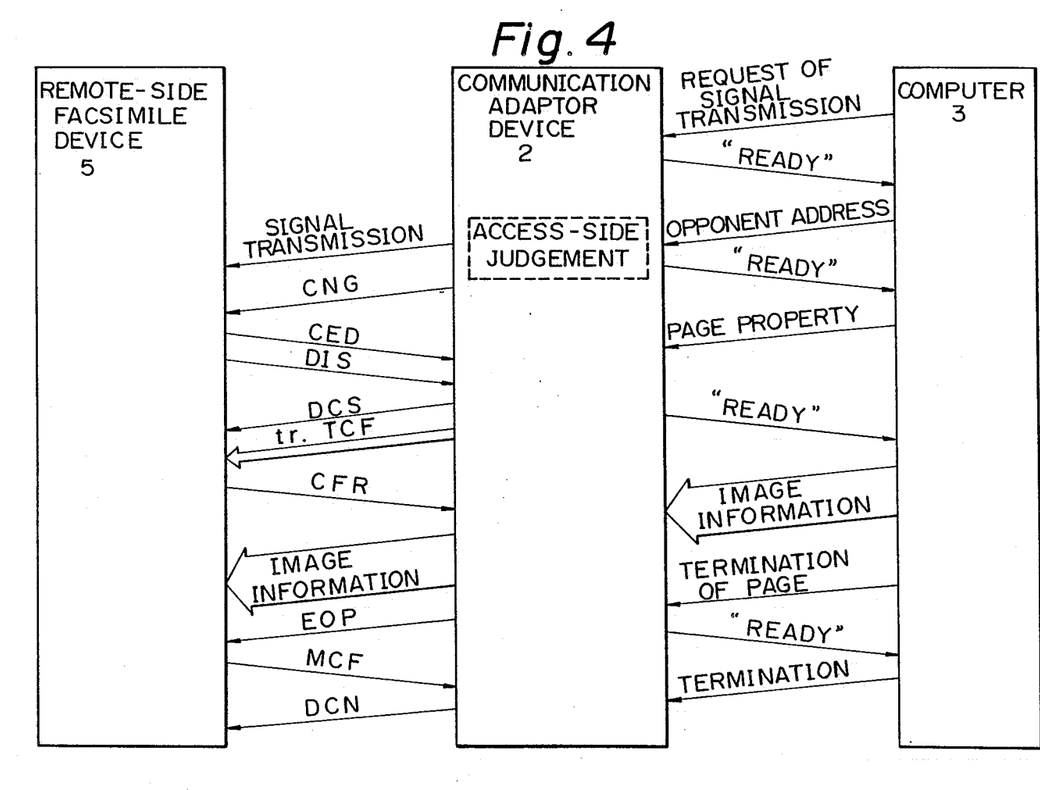
FIG. 4 is an explanatory view showing a procedure of transmitting/receiving signal between respective devices at the time of transmitting image information to the remote-side facsimile device from the computer.

Next, FIG. 4 is an explanatory view showing a respective signals transmitting/receiving procedure in the case of transmitting a telephone call to the remote-side facsimile device 5 from the computer 3. On that occasion, a telephone call transmitting request is noticed to the communication adapter device 2 side from the computer 3 through the digital interface portion 23, by means of the program of the computer or the manipulation performed by an operator.

On the other hand, the transmission control portion 24 performs a "READY" response when it is in a state of being idle. The computer 3 transmits the information of a destination telephone number to the transmission control portion 24 after confirming the state of "READY".

The transmission control portion 24 judges the transmission of the telephone call to the public telephone circuit network 4 when the information of the destination telephone number is transmitted. And then, the same closes the off-hook switch 21b and thereby connects the circuits with each other. Furthermore, the same changes over the change-over circuit 27 to the connection state a-c. At this time, it is checked that the off-hook detector 21a physically connects the circuit with each other. When it cannot be checked, the operation thereof is stopped at this time.

When the circuits are correctly connected, the transmission control portion 24 next sends out a dial signal. Namely, in case that the telephone circuit is now that of a dial pulse type, the portion 24 sends out a predetermined dial pulse signal onto the circuit by the action of opening/closing control of the off-hook switch 21b. On the other hand, in the case of employing the circuit of PB type, the analog switch 28 is turned to a6 side and the analog switch 25g is turned to a7 side. And further, the DTMF signal generator 25h sends out a predetermined DTMF signal. Thereby, the remote-side facsimile device is called out.

During this time, the communication adapter 2 sends the "READY" response to the computer 3, and a page property information of the image information to be transmitted next is transmitted to the communication adaptor 2. The page property information, in the same way as mentioned before, includes the page size of the image information, the line density, the coding mode, and so on, and the same further includes information to be set to the DCS signal which is sent with the transmission control procedure executed next.

After a constant period of time elapsed until the remote-side facsimile device 5 receives a telephone call and performs circuit connection, the analog switch 25g is changed over to the contact point b7 side and a CNG (Calling Tone) signal is sent out from the facsimile tone signal generator 25i. Thereafter, the analog switch 28 is turned to the contact point a6 side and the analog switch 29 is turned to the contact point a5 side.

When the remote-side facsimile device 5 receives a telephone call, the same confirms the CNG signal and sends out the CED signal and the DIS signal.

At the communication adapter device 2 side, the aforementioned CED signal is detected by the facsimile tone detecting circuit 24c and the DIS signal is received by the MODEM 24b. Next, the MODEM 24b sends out the phase-adjusting/training signal "tr" for a high speed MODEM and the TCF signal. Thereby, the remote-side facsimile device 5 executes MODEM training, and when the device 5 succeeds in executing MODEM training the remote-side facsimile device 5 sends out the CFR signal.

Here, when the communication adapter device 2 sends out the response "READY" to the computer 3 through the digital interface portion 23, the computer 3 sends back to the device 2 the image information consisting of a compressed data to be transmitted. The communication adapter device 2 transmits the sent-back image information to the remote-side facsimile device 5 from the MODEM 24b of the device 2. And further, when the termination of the page sent out from the computer 3 is noticed to the communication adapter device 2, the device 2 sends out the EOP signal to the remote-side facsimile device 5.

When the remote-side facsimile device 5 receives the image information normally, it sends back the MCF signal. When the communication adapter device 2 receives the MCF signal, it transmits the response "READY" to the computer 3. Responding to it, the computer 3 notices the termination of the image information to the communication adaptor device 2 when the image information terminates. Here, the communication adapter device 2 sends out the DCN signal to the remote-side facsimile device 5 and cuts off the circuit thereof. At this time, the remote-side facsimile device 5 receives the DCN signal and also cuts off the circuit thereof. In such a way, the communication between the both terminates.

Moreover, in case that the RTN signal showing a signal receiving error is returned back from the remote-side facsimile device 5 instead of the MCF signal after transmitting image information, the MODEM training is executed again in accordance with a predetermined transmission control procedure and thereafter the image information is transmitted again.

In such a way, a telephone call is generated and transmitted from the computer 3 to the remote-side facsimile device 5 and thereafter the image information is transmitted by means of the predetermined facsimile communication.

Figure 5:
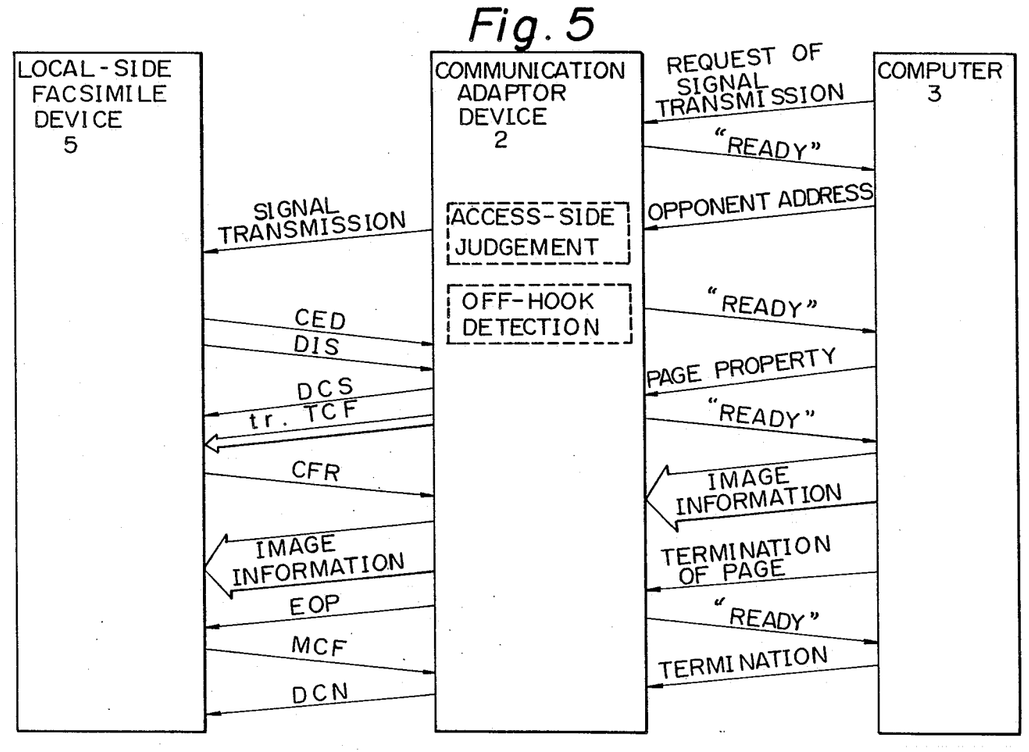
FIG. 5 is an explanatory view showing a procedure of transmitting/receiving signal between respective devices at the time of transmitting image information to the local-side facsimile device from the computer.

Next, FIG. 5 is an explanatory view showing the transmitting/receiving procedure in the case of transmitting the image information from the computer 3 to the local-side facsimile device 1. On this occasion, a telephone call issuing demand is noticed to the communication adaptor device 2 side from the computer 3 through the digital interface portion 23 by use of the program of the computer 3 or by operator's manipulation.

On the other hand, in a state of being idle, the transmission control portion 24 performs a response "READY". The computer 3 transmits the destination (address) information showing the local-side facsimile device 1 to the transmission control portion 24 after confirming the state of "READY".

The transmission control portion 24 discriminates the opponent to be accessed in accordance with the destination (address) information. Now, since the local-side facsimile device 1 is shown, the change-over circuit 22b is turned to a connecting state b-c and the ringing generator 22d is caused to operate, and thereby the ringing generator 22d outputs the telephone call signal. The by-pass capacitor 22e has a capacitance of low impedance in comparison with the calling-out signal of AC. And further, since DC voltage is applied to the one end of the by-pass capacitor 22e, the above-mentioned calling-out signal is superposed with the DC voltage and the signal thus superposed is sent out to the local-side facsimile device 1 through the by-pass capacitor 22e.

When the above-mentioned DC voltage is applied to the local-side facsimile device 1 and the latter receives a calling-out signal, the local side facsimile device 1 operates in the same way as the case of being connected with the ordinary telephone circuit and executes a predetermined signal receiving operation by connecting the circuits therewith.

When the local-side facsimile device 1 receives calling-out signal, the off-hook detector 22f detects the state of signal receiving and the same stops the operation of the ringing generator 22d and changes over the change-over circuit 22b to the state of connection a-c, the analog switch 29 to the contact point b5 side, and the analog switch 28 to the contact point b6 side, respectively.

Thereafter, the local-side facsimile device 1 sends out the CED signal and the DIS signal. After that time, the afore-mentioned change-over circuits (switches) transmit and receive various sorts of procedure signals and send out the image information transmitted from the computer 3 to the local-side facsimile device 1. However, since this procedure is same as that of FIG. 4, the explanation thereof is omitted here.

Next, the case of transmitting the image information to the computer 3 from the local-side facsimile device 1 is described hereinafter.

On this occasion, a specified telephone number not existing in the ordinary telephone numbers is previously settled in order to designate the computer 3 from the local-side facsimile device 1. The operator sets the specified telephone number to the local-side facsimile device 1 as a destination (address) telephone number and performs a predetermined transmission manipulation. Thereby, the operation of the local-side facsimile device 1 is started and the device 1 sends out a predetermined dial signal.

In the communication adaptor 2, usually, the change-over circuit 22b is set to the connection a-c and the analog switch 29 is turned to the contact point b5 side, and the device 2 is kept in a state of waiting.

Now, in case that the local-side facsimile device 1 is the one of dial pulse signal system type, the above-mentioned specified telephone number received by use of the dial pulse is detected by the off-hook detector 22f. On the other hand, in case that the local-side facsimile device 1 is the one of DTMF signal system type, the above-mentioned specified telephone number received by use of the DTMF signal is detected by the DTMF signal detection circuit 24a.

When the transmission control portion 24 discriminates the detected number as a calling-out signal to the computer 3, the portion 24 notices to the computer 3 that the telephone call arrives at the computer 3 from the local-side facsimile device 1. And further, when the portion 24 confirms the state "READY" of the computer 3, the same executes a predetermined transmission control procedure between the transmission control portion 24 and the local-side facsimile device 1 as is the case of executing the procedure between the portion 24 and the remote-side facsimile device 5 as shown in FIG. 3. In such a way, transmission/reception of the image information is executed between the local-side facsimile device 1 and the computer 3.

Next, the case of transmitting the image information in such a manner that the local-side facsimile device 1 gives a telephone call to the remote-side facsimile device 5 is described hereinafter. On this occasion, in the local-side facsimile device 1, the operator sets a destination (address) telephone number and performs a predetermined transmission manipulation.

In such a manner, the operation of the local-side facsimile device 1 is started and thereafter a dial signal is sent out. The dial signal, as mentioned above, is detected by the off-hook detector 22f or the DTMF signal detection circuit 24a. Next, in case that the detected telephone number is not the afore-mentioned specified number, the transmission control portion 24 discriminates the calling-out to the public telephone circuit network 4 side and the same closes the off-hook switch 21b in order to connect the telephone circuits with each other.

And further, as is illustrated in FIG. 4, the dial signal showing the above-mentioned detected dial signal is sent out to the public telephone circuit network 4 by use of the off-hook switch 21b and the DTMF signal generator 25h.

And further, after the afore-mentioned dial signal is detected, the change-over circuit 22b is changed over to the connection state a-c and the ring back tone generator 26f is caused to operate. Thereby, a calling-out sound showing that the destination (address) is called out is transmitted to the local-side facsimile device 1 side. Such procedure of operation is done for the purpose of noticing to the operator that the communication adapter device 2 is performing a calling-out operation to the public communication circuit when the telephone call is manually sent out from telephone.

Next, the change-over circuit 27 is changed over to the connection state a-b. A signal transmission path for connecting the local-side facsimile device 1 and the telephone circuit side with each other is formed by the aforementioned changing-over operation. In consequence, when the remote-side facsimile device 5 as a destination (address) responds thereto, an image information is transmitted by use of a predetermined facsimile communication.

Next, in case that a telephone call arrives at the communication adaptor device 2, assuming that the local-side facsimile device 1 is set so as to respond thereto, the action of receiving the telephone call transmitted from the remote-side facsimile device 5 is explained hereinafter. When the telephone call from the telephone circuit is detected by the ringing detector 21c, the transmission control portion 24 changes over the change-over circuit 22b to the connection state b-c and causes the ringing generator 22d to operate in order to call out the local-side facsimile device 1.

Thereafter, when the off-hook detector 22f detects circuit connection executed by the local-side facsimile device 1, the change-over circuit 27 is changed over to the connection state a-b and the change-over circuit 22b is changed over to the connection state a-c, respectively, and then the circuit connection is executed by closing the off-hook switch 21b.

In such a way, a signal transmission path for connecting the local-side facsimile device 1 and the telephone circuit side with each other is formed so that the image information is received by the local-side facsimile device 1 by means of a predetermined facsimile communication.

Figure 6:
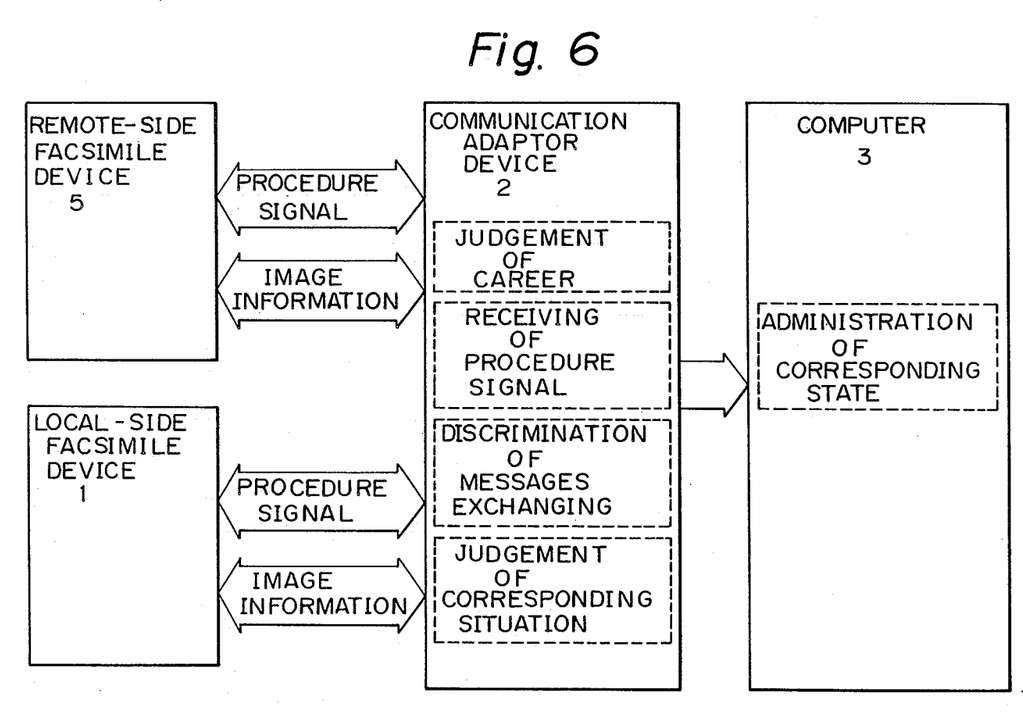
FIG. 6 is an explanatory view showing an operation of administering the state of correspondence executed by the computer.

Next, the administration of the communication state executed by the computer 3 at the time of performing the facsimile communication between the remote-side facsimile device 5 and the local-side facsimile device 1 is described hereinafter.

FIG. 6 is an explanatory view for explaining the administration of the communication state. In FIG. 6, during the time period of executing the above-mentioned facsimile communication (correspondence), the analog switch 29 is changed over to the contact point b5 side. And further, various sorts of procedure signal transmitted between the local-side facsimile device 1 and the remote-side facsimile device 5 are received by the MODEM 24b.

The transmission control portion 24 discriminates the contents of correspondence on the basis of detection time of the various received procedure signals and other informations of the same. Furthermore, depending on those informations, the transmission control portion 24 edits times of calling out the telephone call and receiving the same, corresponding time, corresponding pages number, and correspondence result as the information of correspondence career. And further, in case that the local-side facsimile device 1 sends out a telephone call, the off-hook detector 22f detects the dial signal and judges thereby the telephone number of the destination (address).

The transmission control portion 24 temporarily stores various sorts of information obtained in such a way into the RAM 24g as the correspondence information, and the same transfers the information to the computer 3.

Furthermore, even on the occasion that the telephone at the local-side facsimile device 1 side gives a telephone call to the public telephone circuit network 4 side, the transmission control portion 24 judges the correspondence career such as calling-out time, receiving time and corresponding time period, temporarily stores those data therein in a same way, and transfers the same data to the computer 3 side.

On the basis of the above-mentioned correspondence information, the computer 3 administers the correspondence state of the local-side facsimile device 1, those are, the career of the facsimile correspondence, the communication fees per one case and per a constant time period, and so on.

Hereupon, when a telephone call is previously transmitted at the communication adapter device 2, whether the transmitted telephone call is transferred to the local-side facsimile device 1 or the computer 3 side is set at the communication adapter device 2. However, there are some occasions, on which the device set therefor cannot receive the transmitted telephone call because of executing other processing or being out of order (broken-down out of paper or the like).

Figure 7:
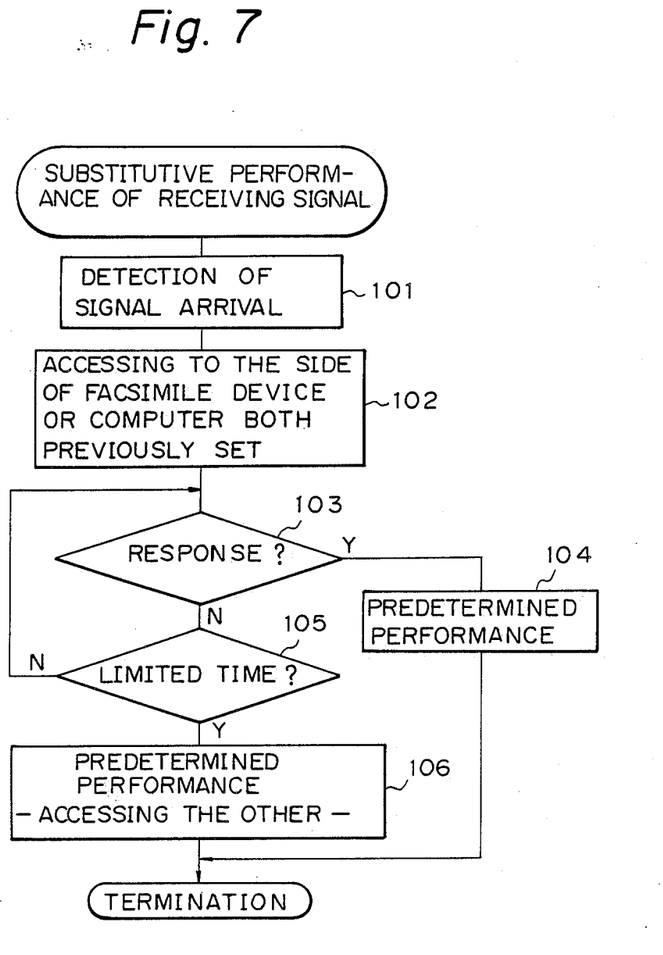
FIG. 7 is a flow chart showing a substitutive signal-receiving operation executed between the computer and the local-side facsimile device at the time of signal arrival.

On that occasion, as shown in FIG. 7, when the arrival of telephone call is detected (Processing 101), a predetermined access is executed at first, for the side of the device being already set among the local-side facsimile device 1 or the computer 3. For instance, a calling-out signal is sent out for the local-side facsimile device 1 while an arrival of telephone call is noticed to the computer 3 (Processing 102). And further, when the accessed device responds to the telephone call (Processing 103Y), the communication adapter device 2 executes the afore-mentioned predetermined operation of receiving the signal (telephone call) arrival and the image information (Processing 104).

Furthermore, presence or absence of its response is detected during a predetermined constant period of time(from Processing 103N to Processing 105, and from Processing 105N to Processing 103). In case that there is no response for such notification after a constant period of time elapses (Processing 105Y), the accessing to the device being already set is stopped. And, next time, both of the afore-mentioned predetermined operations of transmitting signal (telephone call) arrival and receiving the image information are forced to be executed for the other device not yet set among the local-side facsimile device 1 or the computer 3 (Processing 106).

Next, when the power source for the communication adapter device 2 is broken down or the communication adapter device 2 gets out of order, the operator sets the device so as to turn on the power failure direct connection circuit 30. And thereby, the telephone circuit side is directly connected with the local-side facsimile device 1 side by means of the lines so that a correspondence can be done in the same way as the conventional way without intervention of the communication adapter device 2 (i.e., a fail safe mode).

Hereupon, in FIG. 5, in case that the computer 3 transmits a signal (telephone call) the destination (address) is set in the computer 3. However, the manipulation of signal transmission to the telephone circuit can be also done from the local-side facsimile device 1 side.

Figure 8:
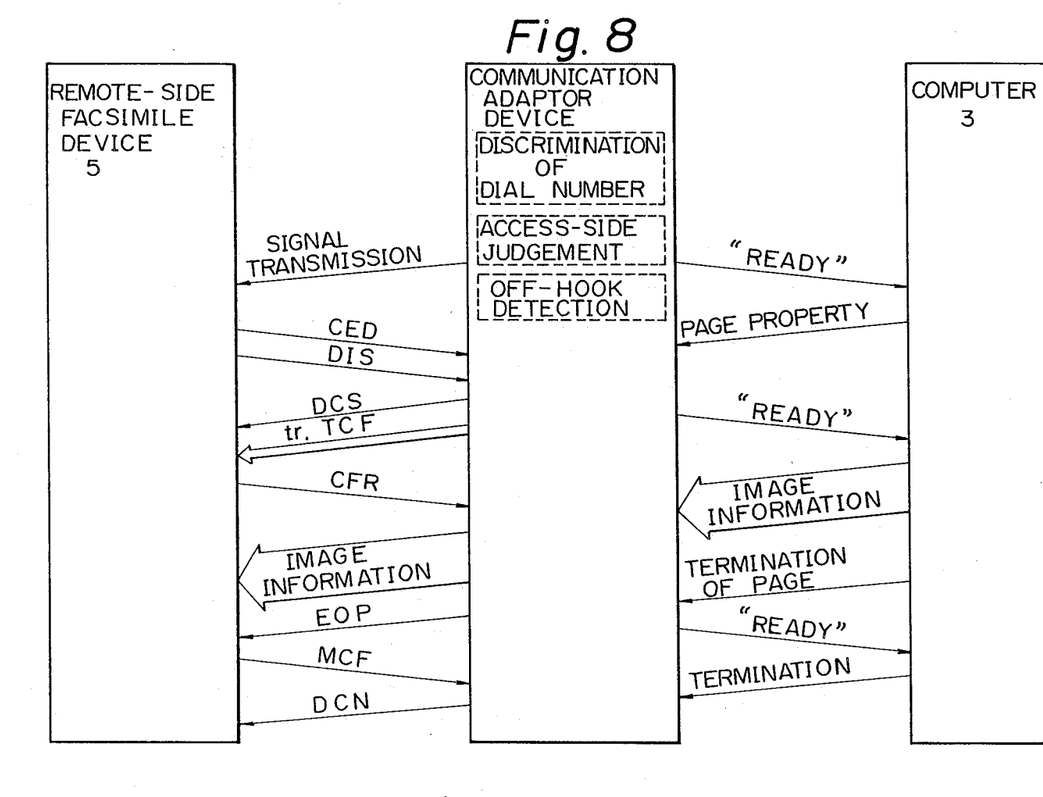
FIG. 8 is an explanatory view showing a procedure of transmitting/receiving signal between respective devices at the time of transmitting image information to the remote-side facsimile device from the computer by practicing a telephone-call-creating manipulation.

FIG. 8 is an explanatory view for showing the procedure of transmitting/receiving the respective signals on this occasion. Namely, on this occasion, the computer 3 is previously set to the manually-transmitting mode. When such setting is done, the manually-transmitting mode is noticed to the communication adapter device 2 from the computer 3.

On this occasion, the operator performs a dial-manipulation to the destination (address) by use of the telephone of the local-side facsimile device 1 side. When the communication adapter device 2 inputs therein (receives) the dial signal from the local-side facsimile device 1 side, the same notices the state of "READY" to the computer 3. On the other hand, the same performs connection to the telephone circuit network 4 side and sends out a dial signal of the same telephone number.

Next, the communication adapter device 2 receives information of the page property information from the computer 3. And further, after the signal (telephone call) from the remote-side facsimile device 5 arrives at the computer 3 the image information is transmitted from the computer 3 in a same way as mentioned before.

As is mentioned heretofore, according to the embodiment of the present invention, the communication adapter device 2 is installed in the system of the embodiment and connected with the telephone circuit, the ordinary local-side facsimile device 1 and the computer 3. And further, in the communication adaptor device 2, each signal transmitting path between two of the three respective devices is formed respectively. Furthermore, the communication adaptor device 2 executes the transmission control procedure with the opponent facsimile device as occasion demands.

In such a way, even though a specialized facsimile device provided with a digital interface portion as is in the conventional way is not used, transmitting/receiving of various sorts of information can be freely done between the computer and one of the facsimile devices by use of the ordinary facsimile device(s).

Consequently, for instance, it may be possible that a communication state is set between the computer (personal computer) 3 and the local-side facsimile device 1, the personal computer 3 can freely employ the plotter installed in the facsimile device in place of a the graphic printer not shown, and the scanner also installed in the same facsimile device as an image scanner.

And further, the procedure signal transmitted between the local-side facsimile device 1 and the remote-side facsimile device 5 is read out by the communication adapter device 2, and thereby the contents of correspondence can be discriminated and transferred to the computer 3 side as a correspondence information. In such a way, the administration of the facsimile correspondence state executed by the computer can be done very easily.

Furthermore, the signal receiving treatment of the image information can be done either by the local-side facsimile device 1 or by the computer 3. Therefore, when the signal (telephone call) arrives at either one of the local-side facsimile device 1 or the computer 3, even though one of the two devices cannot receive the signal the other one can receive the signal. Namely, the system can exhibit a function of mutual substitutive signal-receiving so that the signal-receiving treatment can be done with certainty.

In the afore-mentioned embodiment, the signal arrives at either one of the both devices from the remote-side facsimile device 5, the changing-over setting of whether the image information should be received by the local-side facsimile device 1 or by the computer 3 is performed by the computer 3. However, such changing-over setting can be done in such a manner that a specified telephone number is dialed by use of the telephone of the local-side facsimile device 1 side and the communication adaptor device 2 detects and discriminates the specified telephone number. Or otherwise, it may be also possible that, with respect to the above-mentioned changing-over setting, impossibility of the signal arrival due to breakdown or execution of the other processing procedure is automatically judged by the computer 3 or the communication adapter device 2 in order to automatically set the one of the device which is capable of causing the signal to arrive thereat.

Furthermore, it may be also possible that not only the cutting-off of the power source for the communication adapter device 2 but its internal break-down shall be self-diagnosed, and thereby the power failure direct-connection circuit 30 shall be operated even in case that the system gets out of order. And further, although a microcomputer is included in the communication adapter device 2, control of the respective portions can be also done by the computer 3.

And still further, in the embodiment of the present invention, the facsimile device of the G3-specification type, the present invention can be also applied to the facsimile device of the other-specification type in a similar way, as a matter of course.

As is apparent from the foregoing description, according to the present invention, since a communication adapter is installed at the facsimile station, the telephone circuit, the local-side facsimile device and the computer are connected therewith, respective signal transmitting paths are formed in the correspondence adaptor between the destination addresses, those are, between the remote-side facsimile device and the computer, between the remote-side facsimile device and the local-side facsimile device, and between the local-side facsimile device and the computer, it may be possible that an ordinary facsimile device can be employed instead of the conventional special facsimile device provided with the digital interface portion, and thereby the transmission of the image information can be done freely. Furthermore, since the information based on the correspondence executed between the remote-side facsimile device and the local-side facsimile device is transferred to the above-mentioned computer, the administration of the correspondence state executed by the computer apparently turns out to be more and more easy. And further, when the signal arrives at the facsimile station, the substitutive signal-receiving can be done mutually therebetween on the basis of the state between the computer and the local facsimile device. As a result, the treatment of signal processing can be performed with a high degree of certainty.

What is claimed is:

1. A communication adapter device for use in facsimile device combined with computer, said adapter device comprising:
   (a) a telephone circuit interface portion connected through a public telephone circuit network with a remote-side facsimile device which is a communication exchanging opponent party,
   (b) a facsimile device interface portion connected with the circuit terminal of a local-side facsimile,
   (c) electricity supplying means for supplying electricity to said circuit terminal side of said local-side facsimile device in order to create an electric condition same as that of said public telephone circuit,
   (d) a digital interface portion connected with a digital signal interface terminal of a computer,
   (e) first image information transmitting means for transmitting said image information between said remote-side facsimile device and said computer,
   (f) second image information transmitting means for transmitting said image information between said local-side facsimile device and said computer,
   (g) third image information transmitting means for transmitting said image information between said remote-side facsimile device and said local-side facsimile device, and
   (h) control means for selecting one of said first, second and third image information transmitting means and thereby executing a communication by facsimile, wherein said communication adapter device, said local-side facsimile device and said computer are mutually connected with each other by means of digital telephone circuit,
   wherein said communication adapter device is changed over and connected with said computer by use of communicated signal transmitted from said local-side facsimile device,
   wherein, at the time of dialing from computer side, said computer is changed over and connected with either one of said public telephone circuit and said local-side facsimile device in accordance with a computer program or operator's manipulation,
   and wherein, at the time of receiving signals from said public telephone circuit, whether said computer responds to said received signals or said local-side facsimile device responds to is previously set by said computer.

2. A communication adapter device as defined in claim 1, said adapter device further comprising:
   communication state monitoring mean as for transmitting to said computer an information on the basis of communication executed between said remote-side facsimile device and said local-side facsimile device and monitoring the communication state thereof.

3. A communication adapter device as defined in claim 1, said adapter device further comprising:
   changing-over means for changing over the execution state of facsimile communication either to an execution by means of said computer or to an execution by means of said local-side facsimile device on the basis of the state of said computer and the state of said local-side facsimile device, at the time receiving a message from said remote-side facsimile device.

4. A communication adapter device as defined in claim 1, said adapter device further comprising:
   a direct-connection circuit for directly connecting telephone circuit with said local-side facsimile device when supplying of electric power to said adapter device is stopped, said direct-connection circuit being disposed between said telephone circuit and said local-side facsimile device.

5. A communication adapter device as defined in claim 1, said adapter device further comprising:
   a transmission control portion constructed with a microcomputer system.

6. A communication adapter device as defined in claim 1, said adapter device further comprising:
   a facsimile correspondence portion for transmitting various facsimile signals to facsimile device and receiving various facsimile signals therefrom.

7. A communication adapter device as defined in claim 6, in which facsimile device for transmitting-/receiving facsimile signals is said remote-side facsimile device.

8. A communication adapter device as defined in claim 6, in which facsimile device for transmitting-/receiving facsimile signals is said local-side facsimile device.

9. A communication adapter device as defined in claim 1, in which said telephone circuit interface portion comprising an off-hook detector and a ringing detector.

10. A communication adapter device as defined in claim 1, in which said facsimile device interface portion comprises an off-hook detector for detecting a state of circuit connection of said local-side facsimile device therewith.

11. A communication adapter device as defined in claim 10, said adapter device further comprising:
communication state monitoring means for transmitting to said computer an information on the basis of communication executed between said remote-side facsimile device and said local-side facsimile device and monitoring the communication state thereof.

12. A communication adapter device as defined in claim 10, said adapter device further comprising:
changing-over means for changing over the execution state of facsimile communication either to an execution by means of said computer or to an execution by means of said specialized facsimile device on the basis of the state of said computer and the state of said local-side facsimile device, at the time receiving a message from said remote-side facsimile device.

13. A communication adapter device as defined in claim 10, said adapter device further comprising:
a direct-connection circuit for directly connecting telephone circuit with said local-side facsimile device when supplying of electric power to said adapter device is stopped, said direct-connection circuit being disposed between said telephone circuit and said local-side facsimile device.

14. A communication adapter device as defined in claim 10, said adapter device further comprising:
a transmission control portion constructed with a microcomputer system.

15. A communication adapter device as defined in claim 10, said adapter device further comprising:
a facsimile correspondence portion for transmitting various facsimile signals to facsimile device and receiving various facsimile signals therefrom.

16. A communication adapter device as defined in claim 15, in which facsimile device for transmitting-/receiving facsimile signals is said remote-side facsimile device.

17. A communication adapter device as defined in claim 15, in which facsimile device for transmitting-/receiving facsimile signals is said local-side facsimile device.

18. A communication adapter device as defined in claim 10, in which said telephone circuit interface portion comprising an off-hook detector and a ringing detector.

19. A communication adapter device as defined in claim 10, in which said facsimile device interface portion comprises another off-hook detector for detecting a state of circuit connection of said local-side facsimile device therewith, said another off-hook detector being disposed in said facsimile device interface portion.

* * * * *